Patented Jan. 16, 1951

2,538,513

UNITED STATES PATENT OFFICE 2,538,513

COMPOSITION FOR CONTROL OF MITE AND INSECT PESTS

Eugene E. Kenaga, Midland, Mich., assignor to The Dow Chemical Company, Midland, Mich., a corporation of Delaware No Drawing. Application August 4, 1949, Serial No. 108,655

4 Claims. (Cl. 167—32)

This invention is concerned with improved parasiticidal compositions including a mixture of two toxicant materials.

1,2,3,4,10,10 - hexachloro - 1:4,5,8-diendomethano - 1,4,4a,5,8,8a - hexahydronaphthalene is a known chemical compound having the following formula:

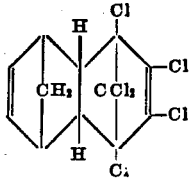

This compound is a crystalline solid melting at 100° to 103° C. It is substantially insoluble in water and completely soluble at room temperature in most common organic solvents, including the highly refined paraffin hydrocarbons. The compound is familiarly known as "Compound 118" and shall hereinafter be so called. It has recently shown promise as an insecticidal toxicant for the control of a number of agricultural and household pests, but at the dosages required is very toxic to warm blooded animals.

According to this invention, it has been discovered that Compound 118 may be combined with the 4-chlorophenyl ester of 4-chlorobenzene sulfonic acid to obtain a parasiticide composition having very desirable properties for the control of plant parasites. When compounded with a carrier in spray and dust compositions, the toxicant mixture appears to exert a toxicity against insects and mites which is greater than additive with respect to that inherent in the constituents of the mixture when employed alone. The use of the mixture of toxicants permits the control of plant parasites with smaller amounts of Compound 118 and of the 4-chlorophenyl ester of 4-chlorobenzene sulfonic acid than would otherwise be required. A further advantage resides in the prolonged residual effect exerted by the mixture. Thus a single application of the mixture gives excellent control of such organisms as *Tetranychus bimaculatus* (two-spotted spider mite), *Bryobia praetiosa* (clover mite), and *Paratetranychus pilosus* (European red mite) for periods ranging up to several months.

In operating in accordance with the present invention, any suitable amount of Compound 118 may be employed in combination with 4'-chlorophenyl 4-chlorobenzene sulfonate to obtain compositions in which the toxicants are mutually activating. The exact amounts of the toxicants in the mixture do not appear to be critical. The preferred proportions are dependent upon the type of composition in which the mixture of toxicants is applied, the organism concerned, and the period for which the residual action and control is desired. Ordinarily, from about 1 to 20 parts by weight of Compound 118 is employed with each 10 parts of 4'-chlorophenyl 4-chlorobenzene sulfonate. In spray compositions, the proportions of the toxicants and dosages applied should be so integrated that the content of Compound 118 is at least 0.1 pound and the content of 4'-chlorophenyl 4-chlorobenzene sulfonate is at least 0.1 pound per 100 gallons. The exact dosages employed are determined by the organism to be controlled and the tolerance of the host plant for the toxicant mixture. In dusts, good results are obtained with compositions containing from 1 to 10 per cent by weight of the mixture of toxicants. With either sprays or dusts, a uniform and thorough coverage of all plant surfaces is desirable. In concentrates, the mixture of toxicants may constitute from about 5 to 95 per cent by weight of the ultimate composition.

It is to be understood that either toxic component may be employed in excess of the indicated preferred proportion. In such a composition the excess of either parasiticide toxicant in no way detracts from the improved results obtainable with the basic synergistic mixture.

The new toxicant mixtures may be employed with an inert material as a carrier, e. g. water, a finely divided solid, a solvent liquid of organic origin, a wetting and dispersing agent, and any suitable combination of these. In such formulations the mixture of toxicants may be present (1) in relatively high proportion to provide a concentrate adapted for further dilution to produce spray or dust compositions or (2) in low proportion to provide compositions suitable for application without further modification.

In the preparation of sprays, Compound 118 and the 4'-chlorophenyl 4-chlorobenzene sulfonate may be separately dispersed in the water or other liquid carrier. Alternatively, the toxicants may be mixed one with the other and the resulting mixture dispersed in the carrier. Another mode of operation includes grinding the toxicants with bentonite, diatomaceous earth or talc, and dispersing the resulting mixture in water. Any compatible wetting or dispersing agent may be employed in the spray compositions.

In the preparation of dusts, the mixture of toxicants may be ground with the finely divided solid carrier in any suitable manner. Operable carriers include volcanic ash, clays, diatomaceous earth, wood flours, pyrophyllite and the like.

Where a concentrate is desired, Compound 118 and the 4'-chlorophenyl 4-chlorobenzene sulfonate may be ground or otherwise dispersed with wetting and dispersing agents to obtain products adapted to be dispersed in water or other aqueous spray composition. Alternatively, the toxicants may be separately compounded in concentrate form and mixed together upon dilution in the spray tank or otherwise. In another mode of operation, the mixture of toxicants may be dispersed in a finely divided solid carrier to produce a concentrate adapted subsequently to be diluted with additional carrier to form dusts.

Wetting and dispersing agents adapted to be employed in the various compositions as suggested above include sodium lauryl sulphate, alkyl aryl sulfonate (Oronite No. 5), alkylated aryl polyether alcohol (Triton X100), dioctyl sodium sulfosuccinate (Aerosol OT), polyethylene sorbitol oleate-laurate (Atlox 1045A), and the polyethylene derivative of sorbitan trioleate (Tween 85).

4'-chlorophenyl 4-chlorobenzene sulfonate is a white crystalline solid melting at 81°–83° C., and having the following formula:

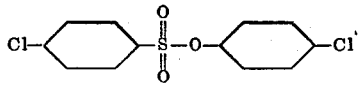

The following examples illustrate the invention but are not to be construed as limiting the same:

*Example 1*

25 parts by weight of Compound 118 and 10 parts of a polymerized ethylene oxide condensation product (Igepal CA) were dispersed in 65 parts of xylene to produce a liquid concentrate. This product is hereinafter referred to as "Concentrate A." In a further operation, 50 parts by weight of 4'-chlorophenyl 4-chlorobenzene sulfonate, 1 part of an alkyl aryl sulfonate (Nacconol NR), 2 parts of the compounded substitute benzoic alkyl sulfonic acids (Daxad No. 27), and 47 parts of fuller's earth were ground together to prepare a wettable powder hereinafter referred to as "Concentrate B."

The respective concentrates were dispersed in water to prepare spray compositions having the following concentrations of toxicants per 100 gallons:

No. 1—¼ pound of Compound 118
No. 2—2 pounds of 4'-chlorophenyl 4-chlorobenzene sulfonate
No. 3—¼ pound of Compound 118 and 2 pounds of 4'-chlorophenyl 4-chlorobenzene sulfonate
No. 4—⅛ pound of Compound 118 and 1 pound of 4'-chlorophenyl 4-chlorobenzene sulfonate The four spray compositions were employed for the control of southern arm worm on mature cranberry bean plants. In such operations, the bean foliage was wet with the indicated composition, the leaf surfaces allowed to dry, and the plants then infested with a known number of insect larvae. 72 hours following infestation, the bean plants were examined to ascertain the degree of control of southern army worm, and the following situation, expressed in per cent kill, was found to exist:

| Composition: | Per cent kill |
|---|---|
| No. 1 | 30 |
| No. 2 | 16 |
| No. 3 | 95 |
| No. 4 | 80 |

*Example 2*

An aqueous spray composition containing 5 pounds of Concentrate A and 2 pounds of Concentrate B per 100 gallons, is applied as a summer spray in an orchard of bearing Jonathan apple trees heavily infested with European red mite and two-spotted spider mite. The spray is applied with a conventional spray rig and in such amount as to accomplish a run off of spray from the leaves and woody surfaces of the trees. Unsprayed check plots are maintained throughout the orchard. As a result of this treatment a commercial control of mite organisms is obtained and persists over the balance of the growing season. No significant leaf or fruit injury results from the application of the spray mixture. Unsprayed check plots continue heavily infested and display significant injury, defoliation, and fruit drop attributable to mite and spider mite attack.

*Example 3*

Concentrates A and B were dispersed in water to prepare a similar set of spray compositions having the following concentrations of toxicants per 100 gallons of spray mixture:

No. 1—2 pounds of Compound 118
No. 2—2 pounds of 4'-chlorophenyl 4-chlorobenzene sulfonate
No. 3—2 pounds of Compound 118 and 2 pounds of 4'-chlorophenyl 4-chlorobenzene sulfonate
No. 4—1 pound of Compound 118 and 1 pound of 4'-chlorophenyl 4-chlorobenzene sulfonate The spray compositions were applied to plots of mature cranberry bean plants which were infested with the adult two-spotted spider mites. At the end of 72 hours the bean plants were examined and the following percentage kills observed:

| Composition: | Per cent kill |
|---|---|
| No. 1 | 22 |
| No. 2 | 16 |
| No. 3 | 99 |
| No. 4 | 74 |

I claim:

1. A composition for the control of mite and insect pests, comprising as active toxic ingredients (1) the 4-chlorophenyl ester of 4-chlorobenzene sulfonic acids and (2) 1,2,3,4,10,10-hexachloro-1:4,5:8-diendomethano-1,4,4a,5,8,8a-hexahydronaphthalene, the active toxic ingredients of such composition being mutually activating.

2. A composition for the control of mite and insect pests, comprising as active toxic ingredients from 1 to 20 parts by weight of 1,2,3,4,10,10-hexachloro-1:4,5:8-diendomethano-1,4,4a,5,8,8a-hexahydronaphthalene for each 10 parts of the 4-chlorophenyl ester of 4-chlorobenzene sulfonic acid, the active toxic ingredients of such composition being mutually activating.

3. A composition for the control of mite and insect pests, comprising a carrier and dispersed therein as active toxic ingredients from 1 to 20 parts by weight of 1,2,3,4,10,10-hexachloro-1:4,5:8-diendomethano-1,4,4a,5,8 8a-hexahydronaphthalene for each 10 parts of the 4-chlorophenyl ester of 4-chlorobenzene sulfonic acid, the active toxic ingredients of such composition being mutually activating.

4. A spray composition for the control of mite and insect pests, comprising an aqueous carrier and dispersed therein as active toxic ingredients from 1 to 20 parts by weight of 1,2,3,4,10,10-hexachloro-1:4,5:8-diendomethano-1,4,4a,5,8,8a-hexahydronaphthalene for each 10 parts of the 4-chlorophenyl ester of 4-chlorobenzene sulfonic acid, the active toxic ingredients in such composition being mutually activating and each being present in the amount of at least 0.1 pound per 100 gallons of spray.

EUGENE E. KENAGA.

REFERENCES CITED

The following references are of record in the file of this patent:

UNITED STATES PATENTS

| Number | Name | Date |
|---|---|---|
| 2,148,928 | Meuron | Feb. 28, 1939 |

OTHER REFERENCES

Weinman: "Chlorinated Hydrocarbon Insecticides . . .," J. Econ. Ent., vol. 42, No. 1, Feb. 1949, pages 135–142.

Schread: "A New Chlorinated Insecticide . . .," J. Econ. Ent., vol. 42, No. 3, June 1949, pages 499–506.

Metcalf: "Acaricidal Properties of Organic Compounds Related to DDT," J. Econ. Tnt., vol. 41, No. 6, Dec. 148, pages 875–882.

Lauger: "Uber Konstitution und toxische Wirkung von . . . synthetischen insektentötenden Stoffen," Helvetica Chimica Acta, vol. 27, June 15, 1944, pages 892–922.

Zimmerman et al.: "DDT-Killer or Killers," Record Press, Rochester, N. H., 1946, page 64.